(12) United States Patent
Agiomyrgiannakis

(10) Patent No.: US 8,645,128 B1
(45) Date of Patent: Feb. 4, 2014

(54) DETERMINING PITCH DYNAMICS OF AN AUDIO SIGNAL

(71) Applicant: Ioannis Agiomyrgiannakis, London (GB)

(72) Inventor: Ioannis Agiomyrgiannakis, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/633,714

(22) Filed: Oct. 2, 2012

(51) Int. Cl.
*G10L 11/04* (2006.01)

(52) U.S. Cl.
USPC ............ 704/207; 704/216; 704/218; 704/231

(58) Field of Classification Search
USPC .................. 704/207, 208, 214, 217, 218, 220
See application file for complete search history.

(56) References Cited

U.S. PATENT DOCUMENTS

| | | | | |
|---|---|---|---|---|
| 4,731,846 A * | 3/1988 | Secrest et al. | ................. | 704/207 |
| 5,208,861 A * | 5/1993 | Fujii | ............................ | 704/208 |
| 5,930,747 A * | 7/1999 | Iijima et al. | .................... | 704/207 |
| 5,946,650 A * | 8/1999 | Wei | ............................... | 704/207 |
| 6,035,271 A * | 3/2000 | Chen | ............................. | 704/207 |
| 6,138,095 A | 10/2000 | Gupta et al. | | |
| 6,226,606 B1 * | 5/2001 | Acero et al. | ................... | 704/218 |
| 6,829,578 B1 * | 12/2004 | Huang et al. | .................. | 704/211 |
| 6,885,986 B1 * | 4/2005 | Gigi | ............................... | 704/207 |
| 8,150,682 B2 | 4/2012 | Nongpiur et al. | | |
| 2003/0093265 A1 * | 5/2003 | Xu et al. | ........................ | 704/208 |
| 2004/0158462 A1 * | 8/2004 | Rutledge et al. | .............. | 704/207 |
| 2004/0172243 A1 | 9/2004 | Ramabadran et al. | | |
| 2005/0240399 A1 * | 10/2005 | Makinen | ....................... | 704/223 |
| 2006/0224380 A1 * | 10/2006 | Hirabayashi et al. | ......... | 704/207 |
| 2009/0048835 A1 * | 2/2009 | Masuko | ........................ | 704/236 |

OTHER PUBLICATIONS

Huang et al. "Pitch Tracking and Tone Features for Mandarin Speech Recognition", IEEE, Icassp, 2000.*
Chen et al. "New Methods in Continuous Mandarin Speech Recognition", EuroSpeech, 1997.*
Agiomyrgiannakis, Yanis; "Sinusoidal Coding of Speech for Voice Over IP," Jan. 2007; pp. 28-34.
Quatieri, Thomas E "Discrete-Time Speech Signal Processing," Principles and Practice, pp. 510-511; Oct. 2001.
de Cheveigne, Alain, "Yin, A Fundamental Frequency Estimator for Speech and Music," J. Acoust. Soc. Am 111 (4), Apr. 2002; 2002 Acoustical Society of America; pp. 1917-1930.

* cited by examiner

Primary Examiner — Jialong He
(74) Attorney, Agent, or Firm — McDonnell Boehnen Hulbert & Berghoff LLP

(57) ABSTRACT

A first-pitch metric function based on a first audio sample and a second pitch-metric function based on a second audio sample may be determined. The first and second pitch-metric functions may have either local minima or local maxima that correspond to candidate pitch values of the first and the second audio samples, respectively. The first and the second pitch-metric functions may be transformed to generate a first and a second transformed pitch-metric function, respectively. A correlation function based on a correlation between the first and the second transformed pitch-metric function may also be determined. A lower-dimensionality representation of the correlation function may further be determined. The lower-dimensionality representation may convey information indicative of pitch dynamics between the first and second audio sample. A computing device having a processor and a memory may perform an action based on the information indicative of the pitch dynamics.

20 Claims, 6 Drawing Sheets

DETERMINING PITCH DYNAMICS OF AN AUDIO SIGNAL

BACKGROUND

Pitch is generally understood as a perception of a tonality of a sound. In the context of speech, a change in pitch of may convey contextual information regarding the speaker's mood or intent, as well as a variety of other effective or affective states. For example, a speaker may change the pitch of the speaker's voice to convey sarcasm, emphasis, or emotion. Additionally, pitch may differentiate two chromatically similar words in tonic languages, such as Mandarin Chinese.

SUMMARY

In a first example embodiment, information indicative of pitch dynamics may be determined. An audio signal may be sampled to provide a first audio sample and a second audio sample. A first-pitch metric function as a function of a pitch parameter based on the first audio sample and a second pitch-metric function as a function of a pitch parameter based on the second audio sample may be determined. The first pitch-metric function may have either local minima or local maxima that correspond to likely candidate pitch values of the first audio sample. The second pitch-metric function may have either local minima or local maxima that correspond to a candidate pitch values of the second audio sample. The first pitch-metric function may be transformed to generate a first transformed pitch-metric function. The second pitch-metric function may be transformed to generate a second transformed pitch-metric function. A correlation function based on a correlation between the first transformed pitch-metric function and the second transformed pitch-metric function may also be determined. A lower-dimensionality representation of the correlation function may also be determined. The lower-dimensionality representation of the correlation function may convey information indicative of pitch dynamics of the audio signal from the first audio sample to the second audio sample. A computing device having a processor and a memory may perform an action based on the information indicative of the pitch dynamics.

In a second example embodiment, a non-transitory computer-readable memory having stored thereon instructions executable by a computing device is provided. The instructions, when executed by the computing device, may cause the computing device to perform functions in accordance with the first example embodiment.

In a third example embodiment, a computing device is provided. The computing device may include at least one processor, a data storage, and program instructions in the data storage. The program instructions, upon execution by the at least one processor, may cause the computing system to perform functions in accordance with the first example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
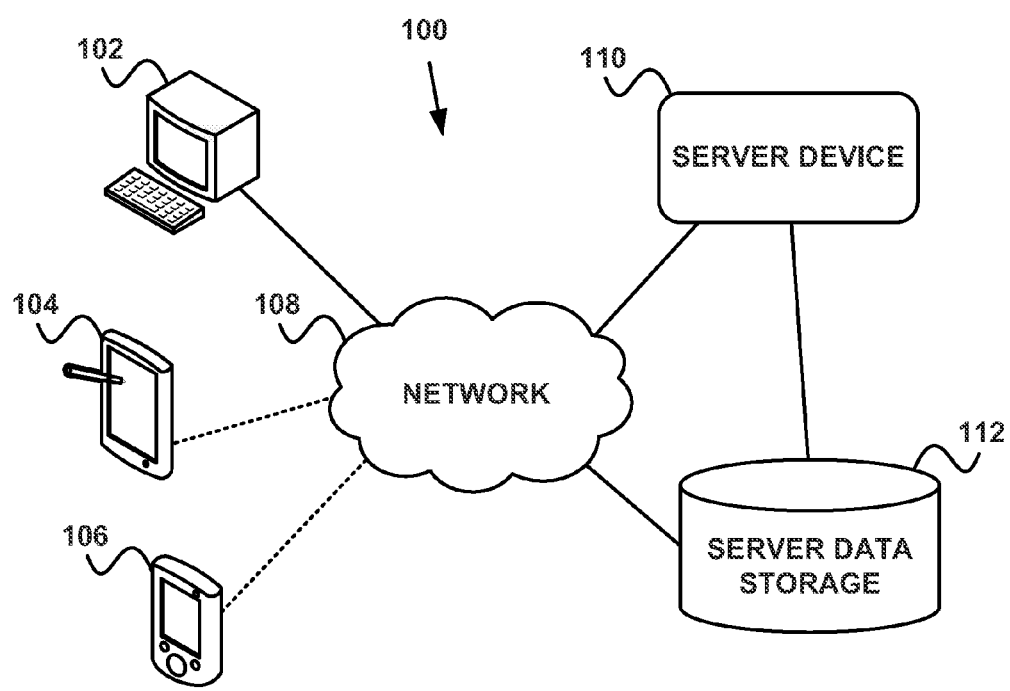
FIG. 1 depicts a distributed computing architecture, in accordance with an example embodiment.

Certain computer systems and applications configured to process human speech may utilize information regarding a change in pitch of an audio signal. For example, automatic speech recognition (ASR) systems may use the change in pitch to process an utterance in order to determine the meaning of the utterance and/or a speaker's intent in speaking the utterance. As another example, a computing device configured to run a query-by-hum application may utilize a change of pitch (or sequence of changes in pitch) in an audio signal of a user's voice to identify a command. In these scenarios, the pitch dynamics of the audio signal, such as a change in pitch and rate of change in the pitch, may have more significance than an actual value of the pitch (e.g., a fundamental frequency) at a given time.

Pitch is well correlated to waveform periodicity and can be represented as a fundamental frequency, which is a physical property of the speech waveform. In the scenarios described above, information regarding the pitch dynamics of the speech waveform, such as a change in pitch or a rate of change in pitch, may be sufficient for a task such that it is not necessary to estimate an actual value of the pitch of the speech waveform at a given time. Furthermore, information regarding pitch dynamics may be in an unprocessed form suitable for modem statistical learning algorithms, avoiding a need to estimate the pitch and/or derivatives of the pitch of the speech waveform at a given time.

As used herein, the term "pitch" refers to and is synonymous with the fundamental frequency of a waveform. Additionally, the term "pitch dynamics" refers to any set of parameters that includes information regarding a change in pitch between two portions of an audio signal, which may include, but is not limited to, a change in pitch, a magnitude of a change in pitch, and a rate of change in pitch.

Disclosed herein are example methods, systems, and computing devices for determining information indicative of pitch dynamics of an audio signal. An example method may include sampling an audio signal to provide a first audio sample and a second audio sample. The example method may also determining first and second pitch-metric functions based on the first and second audio samples, respectively. The pitch-metric functions may be based on one of a number of possible time-domain, frequency-domain, mixed time/frequency domain, or analysis-by-synthesis pitch principles. Depending on the principle upon which the pitch-metric functions are based, the pitch-metric functions may have either local minima or local maxima that correspond to candidate pitch values of the respective audio samples.

The example method may further include transforming the first pitch-metric function and the second pitch-metric function to generate a first transformed pitch-metric function and a second transformed pitch-metric function. The example method may additionally include determining a correlation function based on a correlation between the first transformed pitch-metric function and the second transformed pitch-metric function. The correlation function may, in one example, be a cross-correlation function.

The correlation function may convey information indicative of the pitch dynamics of the audio signal from the first sample to the second sample. Because the correlation function may have many dimensions, the example method may also include determining a lower-dimensionality representation of the correlation function. The lower-dimensionality representation may include fewer dimensions than the correlation function.

The example method may additionally include performing an action based on the information indicative of the pitch dynamics. If the computing device functions as an ASR system, the computing device may use the information indicative of the pitch dynamics to train the ASR system or to identify a text string from a corpus of text strings. As another example, the computing device may identify a command based on the information indicative of the pitch dynamics. Other applications may also be possible.

2. Example Communication System and Device Architecture

The methods, devices, and systems described herein can be implemented using client devices and/or so-called "cloud-based" server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may be interchangeably referred to as "computing devices." Similarly, the "client devices" described herein also may not necessarily be associated with a client/server architecture, and therefore may be interchangeably referred to as "user devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
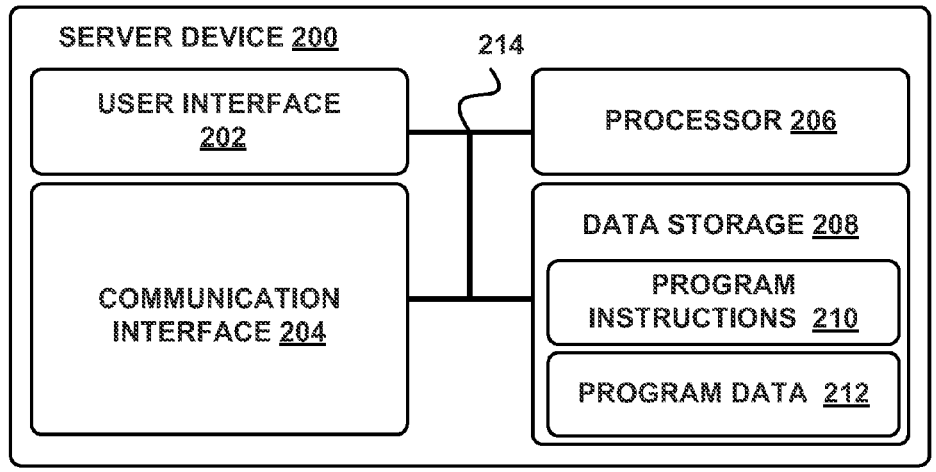
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a Bluetooth® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "cloud-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
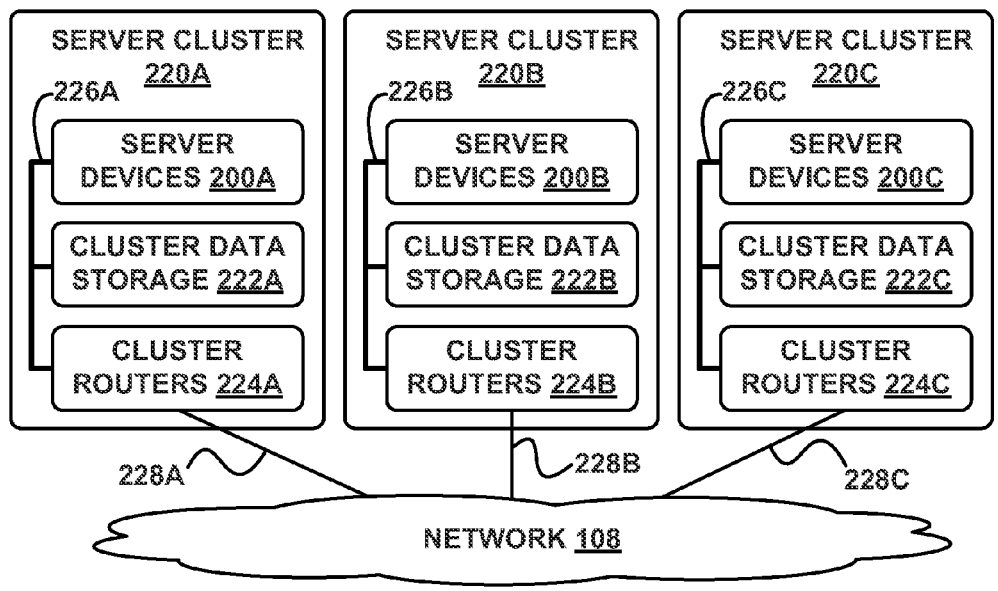
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
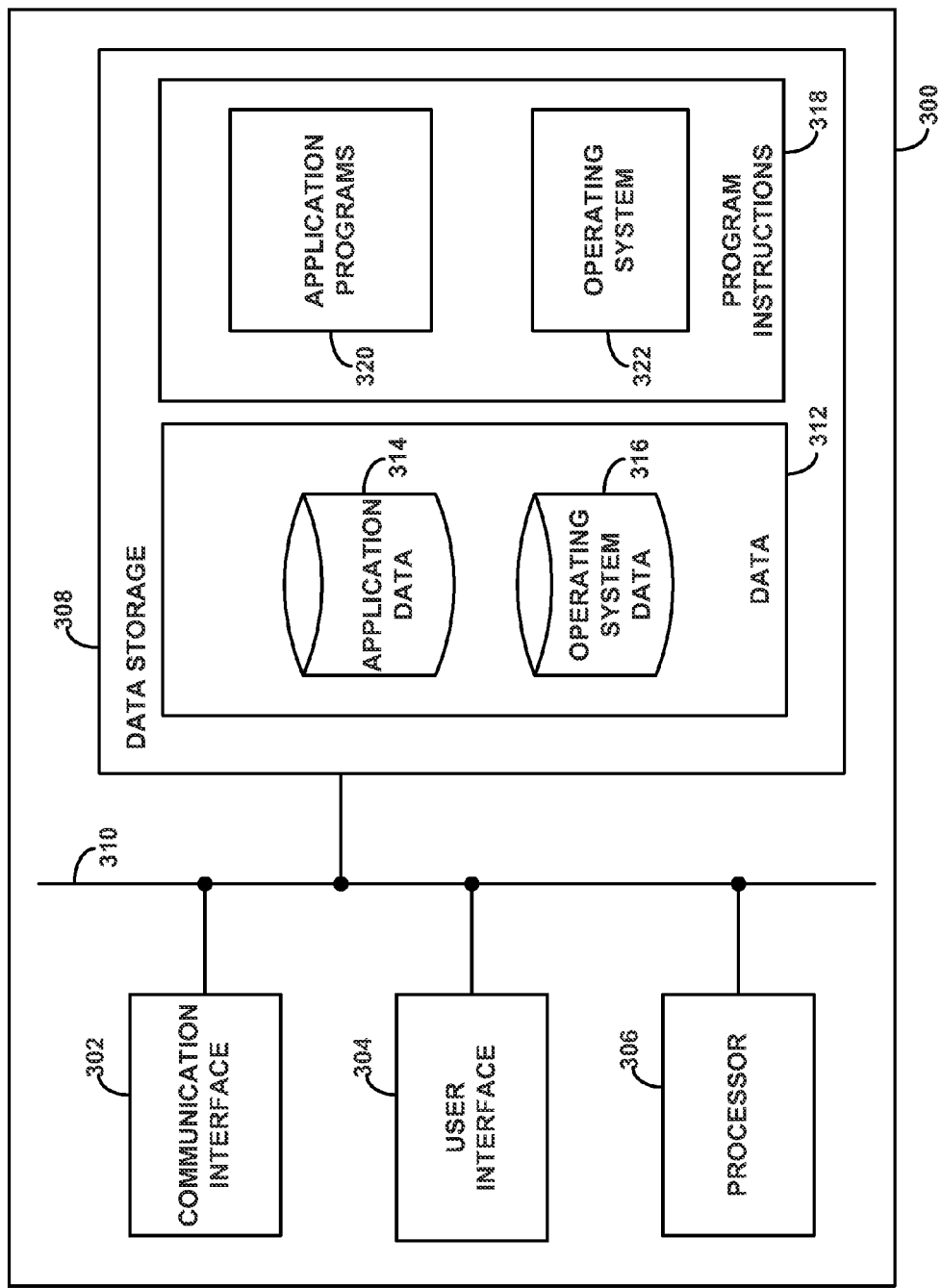
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, Bluetooth, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a Bluetooth® interface, and a wide-area wireless interface).

User interface 304 may function to allow client device 300 to interact with a human or non-human user, such as to receive input from a user and to provide output to the user.

Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Method for Determining a Change in Pitch

Figure 4:
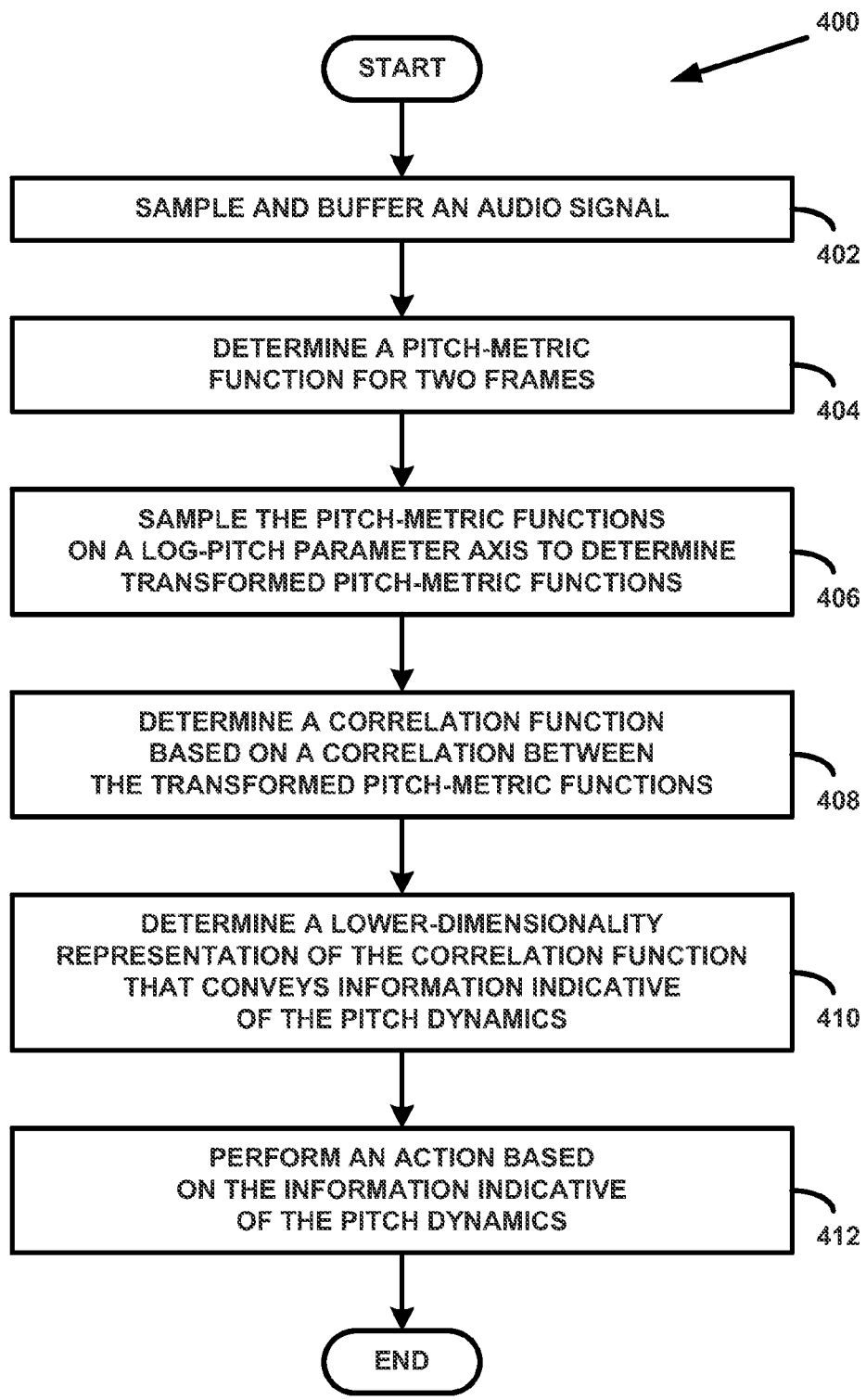
FIG. 4 is a flow diagram of a method, in accordance with an example embodiment.

FIG. 4 is a flow diagram of an example method 400 for in which information indicative of pitch dynamics of an audio signal is determined. A computing device, such as one or more of the computing devices depicted in FIGS. 1-3, may employ the method 400 to determine a change in pitch of an audio signal.

At block 402, the method 400 includes sampling and buffering an audio signal. A computing device may receive an audio signal x[n] from a user interface component, such as a microphone, or from another computing device via a network connection. The computing device may down-sample the audio signal x[n] to determine a sampled audio signal. Down-sampling the audio signal may remove high frequency components that are unnecessary for determining a change in pitch of the audio signal. In one example, the computing device may use a fixed sampling rate, such as a sampling rate of about 8 kHz. In another example, the computing device may vary the sampling rate. In yet another example, the computing device receives the audio signal as the sampled audio signal.

The computing device may then buffer the sampled audio signal to determine a buffered audio signal x[n;k], where k is a frame index. In one example, the length of each frame may be a fixed value, such as a value between 25 msec and 65 msec. In another example, the computing device may vary the length of the each frame based on a signal-to-noise ratio (SNR) of the audio signal. Varying the sampling rate may allow the computing device to account for a change in the noise level of the audio signal that may affect subsequent processing of the frames of the buffered audio signal. For instance, the computing device may be configured to vary the length of each frame from about 25 msec to about 65 msec. If the SNR is high, the length of each frame may be closer to about 65 msec, whereas the length of each frame may be closer to about 25 msec for a low SNR.

At block 404, the method 400 includes determining a pitch-metric function for two frames. A pitch-metric function may, in some instances, be defined as a function of the fundamental frequency of a waveform. The pitch-metric function may convey information related to the probability of a frequency being a fundamental frequency of the speech audio signal. In one example, a pitch-metric function may exhibit local maxima at the frequencies that are candidate pitch values. In another example, a pitch-metric function may exhibit local minima at the frequencies that are candidate pitch values.

When the audio signal contains a single sound source (i.e. a voice), then one candidate pitch value may be the actual pitch of the sound source (e.g. a singer). When the audio signal contains more than one sound source (i.e. a singer and a guitar), then more than one candidate pitch values may correspond to the actual pitch values of the sound sources. A set of candidate pitch values may contain as many actual pitch values as a number of sound sources. The set may also contain candidate pitch values that may not be related to a sound source due to noise. Additionally, the set may also contain candidate pitch values that are harmonically related to the actual pitch value of a sound source (e.g. double or half).

A pitch-metric function g[p;k] may convey information related to a likelihood of a pitch parameter p corresponding to a candidate pitch value of the buffered audio signal x[n;k]. That is, the pitch-metric function g[p;k] may convey information indicative of a given frequency being the fundamental frequency of a waveform included in the buffered audio signal x[n;k]. The pitch parameter could be a frequency, a period, or other parameter that characterizes the pitch of the $k^{th}$ frame. For instance, if the pitch parameter is frequency, the pitch-metric function g[p;k] may convey information indicative of a likelihood that a given frequency is the fundamental frequency of the buffered audio sample x[n;k]. The computing device may determine a first pitch-metric function g[p;l] and a second pitch-metric function g[p;m]. The frames l and m could be successive frames, i.e. with m−l=1. Alternatively, l and m could be non-successive frames, i.e., with m−l>1.

The pitch-metric function g[p;k] may be based on one of a number of possible time-domain, frequency-domain, mixed time/frequency domain, or analysis-by-synthesis pitch estimation principles. If the pitch-metric function g[p;k] is a time-domain function, then the pitch parameter may be a pitch period. Thus, the pitch-metric function g[p;k] may indicate a likelihood as a function of pitch period that a given pitch correlates to a candidate pitch value of the $k^{th}$ frame of the buffered audio signal x[n;k]. In one example, pitch-metric function g[p;k] may be based on the YIN estimator, which is given in part by the following equation:

$$d_t(\tau) = \sum_{j=1}^{W} (x_j - x_{j+\tau})^2$$

where $x$, is the $k^{th}$ frame of the buffered audio signal x[n;k], $\tau$ is a lag time (i.e., pitch period) and W is a window length of the frame. Candidate pitch values may correlate to values of r that correspond to local minima of the pitch-metric function g[p;k]. That is, the pitch period estimated by the YIN estimator may be inversely proportional to a fundamental frequency (i.e., the pitch) of a waveform included in a portion of the audio signal x, included in the frame.

If the pitch-metric function g[p;k] is based on a frequency-domain principle, then the pitch parameter may be frequency. Thus, the pitch-metric function may g[p;k] may indicate a likelihood as a function of frequency that a given frequency corresponds to the candidate pitch value of the $k^{th}$ frame of the buffered audio signal x[n;k]. In one example, the pitch-metric function may be based on a harmonic sinewave model given by the following equation:

$$\omega_o^* = \max_{\omega_o} \sum_{k=1}^{K(\omega_o)} |S(k\omega_o)|^2$$

where $\omega_o$ is a fundamental frequency (e.g., pitch) of a speech waveform, $S(k\omega_o)$ represents one slice of a short-time Fourier transform of the buffered audio signal x[n;k] over a window length, and $K(\omega_o)$ is a number of harmonics in a speech waveform. Candidate pitch values may be frequencies that correspond to local maxima of the pitch-metric function g[p;k].

If the pitch-metric function g[p;k] is based on an analysis-by-synthesis principle, the pitch parameter may also be frequency. In this case, the pitch-metric function g[p;k] may convey information indicative of a likelihood that a frequency corresponds to a candidate pitch value based on a characteristic of the $k^{th}$ frame of the buffered audio signal x[n;k]. For instance, if the characteristic is the SNR of the $k^{th}$ frame, one example of a pitch-metric function based on an analysis-by-synthesis principle may be given by the following equation:

$SNR_{norm}(f;x) = SNR(f;x) - SNR_{bias}(f;x)$ where x is the $k^{th}$ frame of the buffered audio the signal x[n;k], $SNR_{norm}(f;x)$ is a normalized SNR of x at a frequency f, SNR is a signal-to-noise ratio of x at a frequency f, and $SNR_{bias}(f;x)$ is a stochastic integration of SNR(f;x) using a white, Gaussian noise model for x. $SNR_{bias}$ is used to account for possible low-frequency bias that may develop when down-sampling the audio signal x[n]. Candidate pitch values of the $k^{th}$ frame may correspond to frequencies that correspond to a local maxima of the pitch-metric function g[p;k].

At block 406, the method 400 includes sampling the pitch-metric functions on a logarithmic-pitch parameter axis to determine transformed pitch-metric functions. The computing device may determined a transformed pitch-metric function $g[\log_z p;k]$, for the $k^{th}$ frame by sampling the pitch-metric function g[p;k] on a logarithmic-pitch parameter axis using a logarithmic base z. For instance, if the pitch parameter is frequency, the pitch-metric functions g[p;l], g[p;m] are sampled on a log-frequency axis. In one example, the computing device may use a logarithmic base of two to determine the transformed pitch-metric functions. In this example, the transformed pitch-metric function may be written as $g[\log_2 p; k]$. In another example, the computing device may use a different logarithmic base to determine the transformed pitch-metric function.

The computing device may sample the first pitch-metric function on the logarithmic-pitch parameter axis to determine a first transformed pitch-metric function $g[\log_Z p; l]$. The computing device may also sample the second pitch-metric function on the logarithmic-pitch parameter axis to determine a second transformed pitch-metric function $g[\log_Z p; m]$. Additionally, sampling the pitch-metric functions $g[p; l]$, $g[p; m]$ on the logarithmic-pitch parameter may include filtering the pitch-metric functions. For instance, since a human voice may have a fundamental frequency between about 55 Hz and about 355 Hz, the transformed pitch-metric functions may reduce the spectral range down to a range of pitch parameters corresponding to a frequency range of about 55 Hz to about 355 Hz.

In one example, the computing device may also apply a modification factor A to the pitch parameter when determining the transformed pitch-metric functions. The modification factor may adjust the scaling of the pitch parameter on the logarithmic-pitch parameter axis. For instance, the computing device may determine the transformed pitch-metric function $g[\log_Z(A \times p); l]$ and the second pitch-metric function $g[\log_Z(A \times p); m]$.

At block 408, the method 400 includes determining a correlation function based on a correlation between the transformed pitch-metric functions. Since the first transformed pitch-metric function $g[\log_Z p; l]$ and the second transformed pitch-metric function $g[\log_Z p; m]$ are functions of a logarithm of the pitch parameter, changes in the pitch parameter between the two frames may have an approximately linear relationship. Thus, a correlation function $r[t; k]$ may convey information indicative of pitch dynamics between the two frames, such as information indicative of a magnitude of a change in pitch and/or a rate of change of the pitch.

Additionally, for a slow-varying waveform in which the pitch does not change substantially between two frames, the correlation function $r[t; k]$ may not be adversely affected by errors that affect traditional pitch estimation techniques, such as halving or doubling of the pitch frequency or pitch period. Furthermore, since the correlation function $r[t; k]$ is not based on estimations of actual frequencies or periods corresponding to the pitch of a given frame, the correlation function $r[t; k]$ may not be as adversely affected by noise in the audio signal $x[n]$ as other methods or processes that employ an initial pitch estimation step.

In one example, the correlation function $r[t; k]$ may be a cross-correlation between the first transformed pitch-metric function and the second transformed pitch-metric function. In this example, the correlation function $r[t; m]$ may be given by the following equation:

$$r[t; m] = \int_0^\infty g[\log_2 p; l] \cdot g[t + \log_2 p; m] dp$$

The correlation function $r[t; m]$ may represent a lag in the pitch parameter from the $l^{th}$ frame to the $m^{th}$ frame. In another example, the correlation function $r[t, k]$ is determined using any suitable correlation technique or combination of techniques.

Figure 5A:
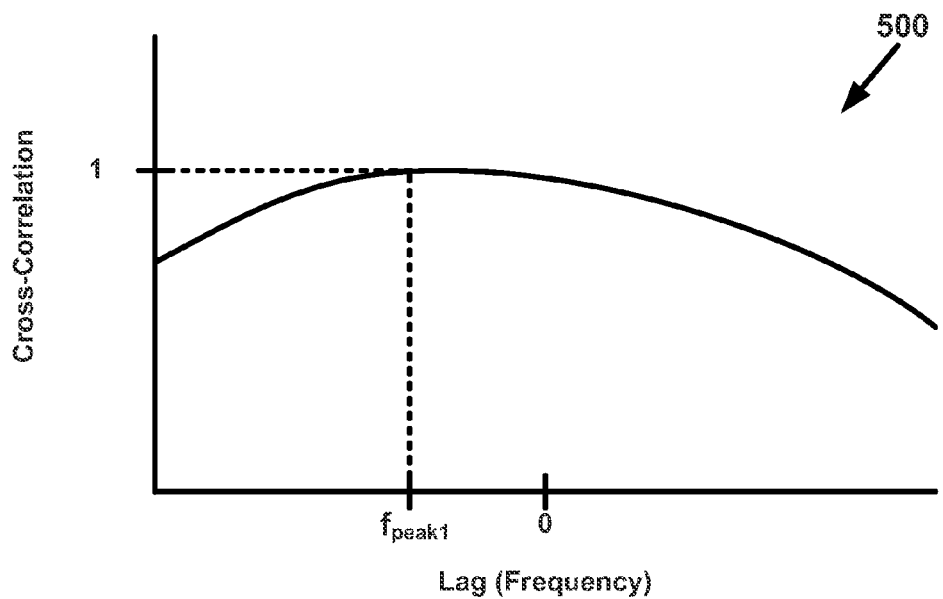
FIGS. 5A-5D depict example graphs of correlation functions, in accordance with an example embodiment.
Figure 5B:
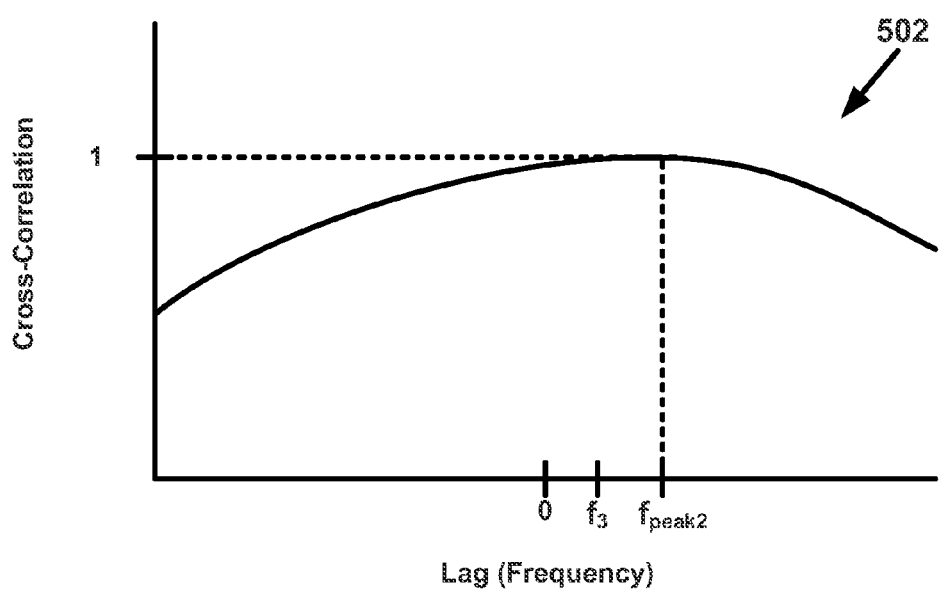
Figure 5C:
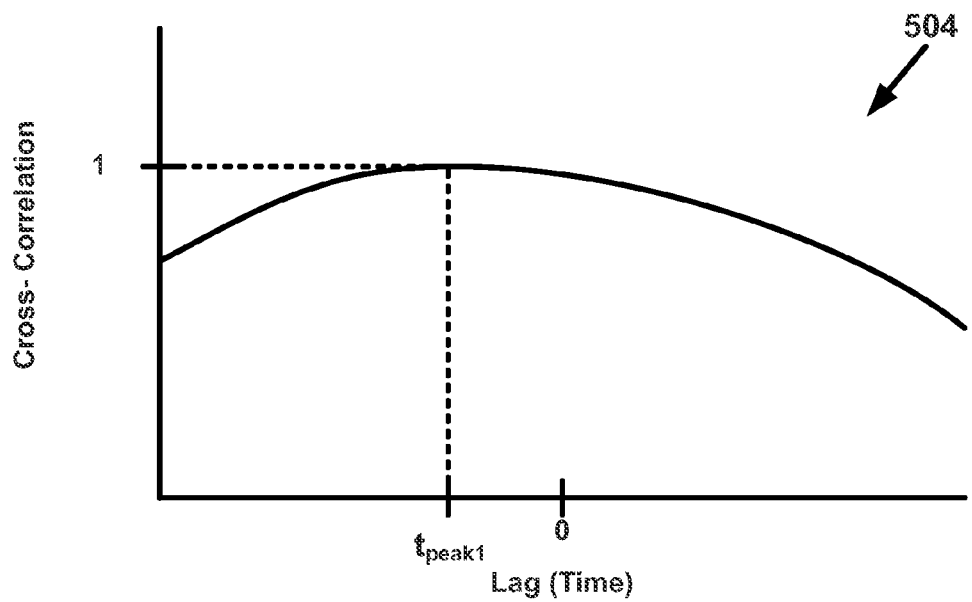
Figure 5D:
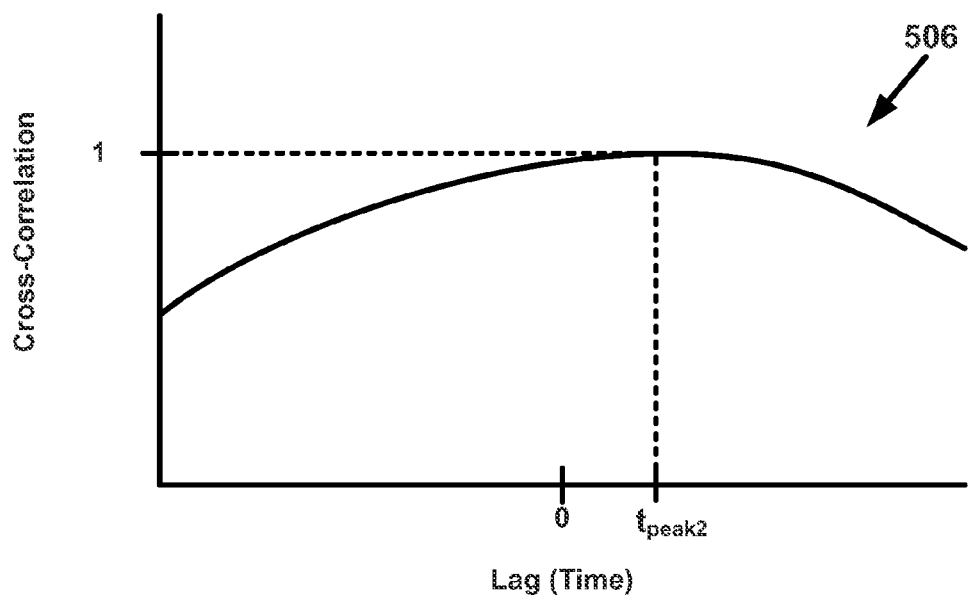

As previously stated, the correlation function $r[t, k]$ may convey information indicative of the pitch dynamics of the audio signal $x[n; k]$ from the $l^{th}$ frame to the $m^{th}$ frame. FIGS. 5A-5D are graphs of example correlation functions that may convey information indicative of the pitch dynamics between two frames of the audio signal $x[n]$. Specifically, FIGS. 5A and 5B are graphs of example cross-correlation functions in which the pitch parameter is frequency, while FIGS. 5C and 5D are graphs of example cross-correlation functions in which the pitch parameter is pitch period.

FIG. 5A is a graph of a first example correlation function 500. The first example correlation function 500 may have a peak that corresponds to a negative lag frequency $f_{peak1}$. In this example, the first example correlation function 500 may convey information indicative of a change in pitch from the $l^{th}$ frame to the $m^{th}$ frame of the buffered audio signal $x[n; k]$ that is negative. FIG. 5B is a graph of a second example correlation function 502. In contrast to the first example correlation function 500, the second example correlation function 502 may have a peak that corresponds to a positive lag frequency $f_{peak2}$. In this example, the second example correlation function 502 may convey information indicative of a change in pitch from the $l^{th}$ frame to the $m^{th}$ frame of the buffered audio signal $x[n; k]$ that is positive.

In another example, the pitch parameter is a period, and the cross-correlation function $r[t; k]$ represents a correlation between the first transformed pitch-metric function $g[\log_Z (A \times p); l]$ and the second transformed pitch-metric function $g[\log_Z (A \times p); m]$ as a function of a lag period. In this example, a peak value of the correlation function $r[t; m]$ corresponding to a negative lag period may convey information indicative of a change in pitch that is positive. That is, because the pitch period is inversely proportional to the pitch, a decrease in the pitch period between the frames may indicate that a pitch of the $m^{th}$ frame is greater than a pitch of the $l^{th}$ frame. Conversely, a peak value of the correlation function $r[t; k]$ that corresponds to a positive lag period may convey information indicative of a change in pitch that is negative.

FIG. 5C is a graph of a third example correlation function 504. The third example correlation function 504 may have a peak that corresponds to a negative lag time $t_{peak1}$. In this example, the third example correlation function 504 may convey information indicative of a change a change in pitch from the $l^{th}$ frame to the $m^{th}$ frame of the audio signal $x[n; k]$ that is positive. FIG. 5D is a graph of a fourth example correlation function 506. The fourth example correlation function 506 may have a peak that corresponds to a positive lag time $t_{peak2}$. In this example, the fourth example correlation function may convey information indicative of a change in pitch that is negative.

Additionally, the correlation function $r[t; k]$ may convey information indicative of a rate of change of the pitch. For example, if $f_2$ is greater than $f_3$, as indicated in FIG. 5B, then the first example correlation function 510 may convey information indicative of a rate of change of the pitch from that is greater than a correlation function having a peak value that corresponds to $f_3$.

Returning to FIG. 4, the computing device may also determine a normalized correlation function $r'[t; m]$. Normalizing the correlation function $r[t; m]$ may enhance the pitch dynamics for weakly periodic signals. However, normalizing the correlation function $r[t; m]$ may also make the correlation function more susceptible to noise. In one example, the computing device determines a normalized correlation function upon determining that the SNRs of the audio signals $x[n; l]$, $x[n; m]$ are above a threshold SNR.

At block 410, the method 400 includes determining a lower-dimensionality representation of the correlation function that conveys information indicative of the pitch dynamics. While the correlation function r[t;k] (or the normalized correlation function r'[t;k]) may convey information indicative of the pitch dynamics, the correlation function r[t;k] may have many dimensions (i.e., parameters), perhaps as many as several hundred dimensions or more. A lower-dimensionality representation a[f;k] of the correlation function r[t;k] may compress the correlation function r[t;k] while retaining information indicative of the pitch dynamics between the first audio sample x[n;l] and the second audio sample x[n;m].

Because a speech waveform is typically slow-varying, the lower-dimensionality representation a[f;k] may include a sufficient number of dimensions to accurately reproduce the information indicative of the pitch dynamics included in the correlation function r[t;k]. The lower-dimensionality representation a[f;k] may thus allow the computing device to more efficiently process the audio signal x[n] when performing an action based on the information indicative of the pitch dynamics. A level of accuracy of a reproduction of the information indicative of the pitch dynamics may vary with the SNR of the first frame x[n;l] and the second frame x[n;m]. That is, the higher the SNR of the frames, the higher the level of accuracy of the reproduction.

In one example, the computing device may determine the lower-dimensionality representation a[f;k] of the correlation function r[t;k] (or the normalized correlation function r'[t;k]) by determining a discrete transform, such as a discrete cosine transform. For a typical speech waveform, the lower-dimensionality representation a[f;k] may have about eight to ten dimensions. In another example, the computing device may determine the lower-dimensionality representation a[f;k] using another discrete transform.

In yet another example, the computing device may select from a number of possible transforms or techniques to determine the lower-dimensionality representation a[f;k] based on the SNR of the $l^{th}$ frame and/or $m^{th}$ frame of the buffered audio signal x[n;k]. For instance, if the SNRs are above a threshold SNR, the computing device may determine the lower-dimensionality representation a[f;k] using a discrete cosine transform. If the SNRs are below the threshold SNR, the computing device may determine the lower-dimensionality representation a[f;k] using a different transform, perhaps by using a discrete Fourier transform. Other examples may also be possible.

At block 412, the method 400 includes performing an action based on the information indicative of the pitch dynamics. In one example, the computing device functions as an ASR system. The computing device may use the information indicative of the pitch dynamics to identify a text string corresponding to an utterance from a corpus of text stings. For instance, the computing device may determine that an utterance could correspond to two chromatically similar text strings. The computing device may distinguish between the text strings based on the information indicative of the pitch dynamics, perhaps by processing the information indicative of the pitch dynamics to determine whether a change in pitch is greater than a threshold. That is, the computing device may identify a first text string if the change in pitch is below the threshold, and the computing device may identify a second text string if the change in pitch is above the threshold. Alternatively, the computing device may use the information indicative of the pitch dynamics to train the ASR system. In this scenario, the computing device may not process the information indicative of the pitch dynamics. Rather, the computing device may train the ASR system using the information indicative of the pitch dynamics.

In another example, the computing device may function as an emotion recognition system. The computing device may utilize the information indicative of the pitch dynamics to identify an emotion of a speaker. For example, certain pitch dynamics may indicate that a speaker is happy. The computing device may process the information indicative of the pitch dynamics and may perform an action in response to determining that the information indicative of the pitch dynamics indicates that the user is happy.

In yet another example, the computing device may be a component of a query-by-hum system. A user of the computing device may use a change in pitch of the user's voice to cause the computing device to execute a command. For instance, a first command may correspond to a first pitch dynamic, and a second command may correspond to a second pitch dynamic. The computing device may process the information indicative of the pitch dynamics to identify one of the first command or the second command as the user requested command.

After performing the steps of block 412, the method 400 may end. In one example, the computing device may perform additional iterations of the method 400. For instance, in a second iteration of the method 400, the computing device may determine a second change in pitch between frames [m+l, m].

4. CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

For situations in which the systems discussed here collect personal information about users, the users may be provided with an opportunity to opt in/out of programs or features that may collect personal information (e.g., information about a user's preferences or a user's utterances made to an ASR system). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   sampling an audio signal to provide a first audio sample and a second audio sample;
   determining a first pitch-metric function as a function of a pitch-parameter based on the first audio sample and a second pitch-metric function as a function of the pitch-parameter based on the second audio sample, wherein the first pitch-metric function represents likelihoods that a plurality of values of the pitch-parameter correspond to a pitch of the first audio sample and has either local minima or local maxima that correspond to candidate pitch values of the first audio sample, and wherein the second pitch-metric function represents likelihoods that a plurality of values of the pitch-parameter correspond to a pitch of the second audio sample and has either local minima or local maxima that correspond to candidate pitch values of the second audio sample;
   transforming the first-pitch metric function to generate a first transformed pitch-metric function and transforming the second pitch-metric function to generate a second transformed pitch metric function;
   determining a correlation function based on a correlation between the first transformed pitch-metric function and the second transformed pitch-metric function;
   determining a lower-dimensionality representation of the correlation function that conveys information indicative of pitch dynamics between the first audio sample and the second audio sample, wherein a type of the lower-dimensionality representation depends on a signal-to-noise ratio of the audio signal; and
   performing an action, by a computing device having a processor and a memory, based on the information indicative of the pitch dynamics.

2. The method of claim 1, wherein the first audio sample and the second audio sample are frames of a buffered audio signal.

3. The method of claim 2, wherein the first audio sample and the second audio sample have respective lengths that are based on a signal-to-noise ratio of the buffered audio signal.

4. The method of claim 2, wherein the first audio sample and the second audio sample are successive frames of the buffered audio signal.

5. The method of claim 1, wherein the first audio signal and the second audio signal include human speech.

6. The method of claim 1, further wherein:
   transforming the first pitch-metric function includes sampling the first pitch-metric function on a log-pitch parameter axis; and
   transforming the second pitch-metric function includes sampling the second pitch-metric function on the log-pitch parameter axis.

7. The method of claim 1, wherein determining the lower-dimensionality representation of the correlation function includes determining a discrete cosine transform of the correlation function.

8. The method of claim 7, wherein the correlation function is a cross-correlation function.

9. The method of claim 1, wherein the pitch-parameter is pitch period.

10. The method of claim 1, wherein the pitch-parameter is pitch frequency.

11. The method of claim 1, wherein the first pitch-metric function and the second pitch-metric function are analysis-by-synthesis functions.

12. The method of claim 1, wherein performing the action comprises identifying a command based on the information indicative of the pitch dynamics.

13. The method of claim 1, wherein performing the action comprises training an automatic speech recognition system to recognize a text string.

14. A non-transitory computer-readable memory having stored therein instructions executable by a computing device to cause the computing device to perform functions comprising:
   sampling an audio signal to provide a first audio sample and a second audio sample;
   determining a first pitch-metric function as a function of a pitch-parameter based on the first audio sample and a second pitch-metric function as a function of the pitch-parameter based on the second audio sample, wherein the first pitch-metric function represents likelihoods that a plurality of values of the pitch-parameter correspond to a pitch of the first audio sample and has either local minima or local maxima that correspond to candidate pitch values of the first audio sample, and wherein the second pitch-metric function represents likelihoods that a plurality of values of the pitch-parameter correspond to a pitch of the second audio sample and has either local minima or local maxima that correspond to candidate pitch values of the second audio sample;
   transforming the first-pitch metric function to generate a first transformed pitch-metric function and transforming the second pitch-metric function to generate a second transformed pitch metric function;

determining a correlation function based on a correlation between the first transformed pitch-metric function and the second transformed pitch-metric function;

determining a lower-dimensionality representation of the correlation function that conveys information indicative of pitch dynamics between the first audio sample and the second audio sample, wherein a type of the lower-dimensionality representation depends on a signal-to-noise ratio of the audio signal; and performing an action based on the information indicative of the pitch dynamics.

15. The non-transitory computer readable memory of claim 14, wherein:

transforming the first pitch-metric function includes sampling the first pitch-metric function on a log-pitch parameter axis; and transforming the second pitch-metric function includes sampling the second pitch-metric function on the log-pitch parameter axis.

16. The non-transitory computer readable memory of claim 15, wherein the correlation function is a cross-correlation function.

17. The non-transitory computer readable memory of claim 16, wherein determining the lower-dimensionality representation of the correlation function includes determining a discrete cosine transform of the correlation function.

18. A computing device comprising:

at least one processor;

data storage; and program instructions in the data storage that, upon execution by the at least one processor, cause the computing device to:

sample an audio signal to provide a first audio sample and a second audio sample;

determine a first pitch-metric function as a function of a pitch-parameter based on the first audio sample and a second pitch-metric function as a function of the pitch-parameter based on the second audio sample, wherein the first pitch-metric function represents likelihoods that a plurality of values of the pitch-parameter corresponds to a pitch of the first audio sample and has either local minima or local maxima that correspond to candidate pitch values of the first audio sample, and wherein the second pitch-metric function represents likelihoods that the a plurality of values of the pitch-parameter correspond to a pitch of the second audio sample and has either local minima or local maxima that correspond to candidate pitch values of the second audio sample;

transform the first-pitch metric function to generate a first transformed pitch-metric function and transforming the second pitch-metric function to generate a second transformed pitch metric function;

determine a correlation function based on a correlation between the first transformed pitch-metric function and the second transformed pitch-metric function;

determine a lower-dimensionality representation of the correlation function that conveys information indicative of pitch dynamics between the first audio sample and the second audio sample, wherein a type of the lower-dimensionality representation depends on a signal-to-noise ratio of the audio signal; and perform an action based on the pitch dynamics.

19. The computing device of claim 18, wherein the computing device functions as an automatic speech recognition system, and wherein the action includes one of training the automatic speech recognition system based on the information indicative of the pitch dynamics or identifying a text string from a corpus of text strings based on the information indicative of the pitch dynamics.

20. The computing device of claim 18, wherein the action comprises identifying a command based on the information indicative of the pitch dynamics.

* * * * *